United States Patent [19]

Frerichs

[11] Patent Number: 4,496,959
[45] Date of Patent: Jan. 29, 1985

[54] COUPLING FOR THE LEAKAGE-FREE CONNECTION OF FLUID-FILLED PIPES AND CONTAINERS

[75] Inventor: Klaus-Dieter Frerichs, Schortens, Fed. Rep. of Germany

[73] Assignee: Olympia Werke AG, Wilhelmshaven, Fed. Rep. of Germany

[21] Appl. No.: 417,897

[22] Filed: Sep. 14, 1982

[30] Foreign Application Priority Data

Sep. 24, 1981 [DE] Fed. Rep. of Germany ....... 3137969

[51] Int. Cl.³ .................... G01D 15/18; F16L 37/28
[52] U.S. Cl. ............................. 346/140 R; 346/75; 137/614.05; 137/508
[58] Field of Search ............ 346/140 R, 75; 251/149.1–149.9; 137/614, 614.05, 614.06

[56] References Cited

U.S. PATENT DOCUMENTS

| | | |
|---|---|---|
| 3,747,120 | 7/1973 | Stemme . |
| 3,871,004 | 3/1975 | Rittberg . |
| 4,143,853 | 3/1979 | Abramson ........................ 251/149.1 |
| 4,144,537 | 3/1979 | Kimura et al. . |
| 4,330,010 | 5/1982 | Drescher et al. . |
| 4,342,042 | 7/1982 | Cruz-Uribe et al. ............. 346/140 R |
| 4,376,283 | 3/1983 | Bower ............................. 346/140 R |
| 4,429,713 | 2/1984 | Walter ......................... 137/614.03 X |

FOREIGN PATENT DOCUMENTS 2416836  11/1976  Fed. Rep. of Germany .

*Primary Examiner*—E. A. Goldberg
*Assistant Examiner*—Gerald E. Preston
*Attorney, Agent, or Firm*—Spencer & Frank

[57] ABSTRACT

A fluid coupler for making a leakage-free connection between first and second fluid-containing members. One half of the coupler comprises a plate having a conical opening in one surface across which an elastic sealing membrane is stretched by a clamping ring, the elastic sealing membrane having a slit at its center which is kept closed by the stretching action of the clamping ring. The other half of the fluid coupler comprises a hemispherical member having an axial aperture and a valve which is positioned within the aperture. When the two coupling halves are brought together, the hemispherical member presses against the elastic sealing membrane thereby opening the slit and expelling any air present in the coupling region.

6 Claims, 7 Drawing Figures

U.S. Patent  Jan. 29, 1985  Sheet 1 of 2  4,496,959
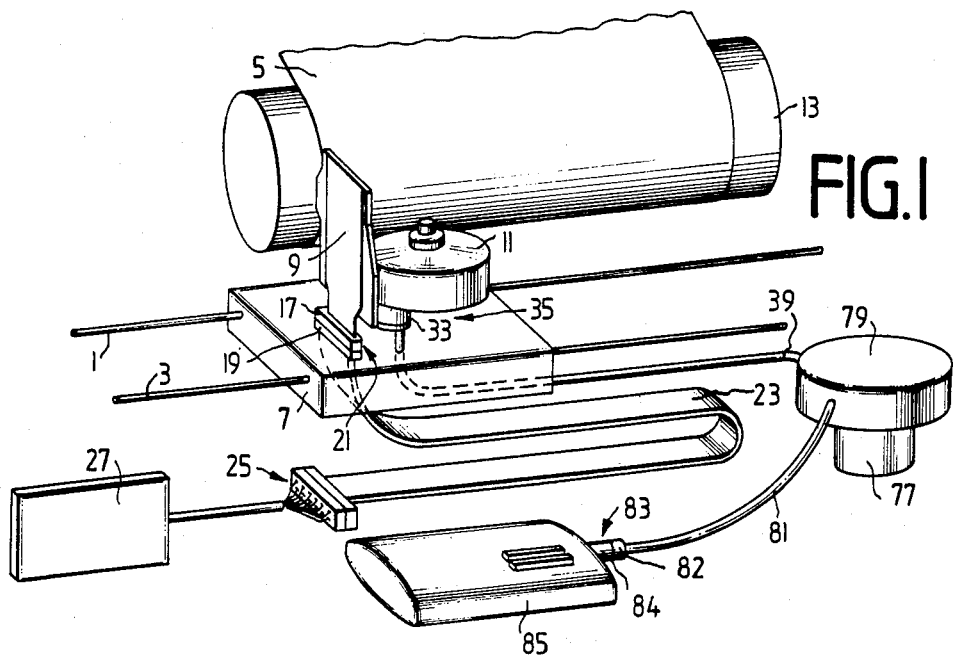
FIG.1
FIG.3
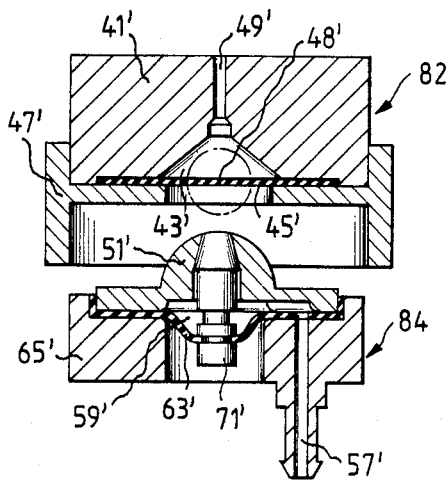
FIG.4a
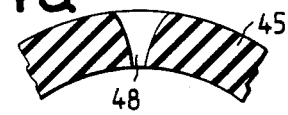
FIG.4b
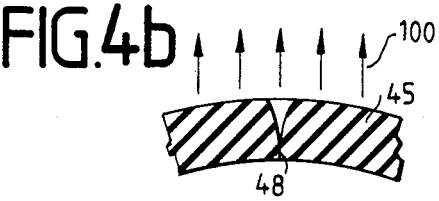
FIG.4c
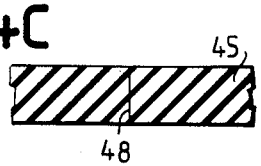
FIG.4d
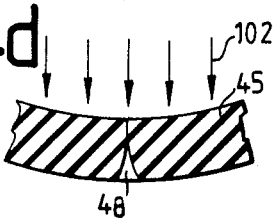

COUPLING FOR THE LEAKAGE-FREE CONNECTION OF FLUID-FILLED PIPES AND CONTAINERS

BACKGROUND OF THE INVENTION

The present invention relates to a fluid coupler for making a leakage-free connection between fluid-filled pipes and containers and, in particular, to a coupler employing two half-couplers each including a switchable valve and an adjusting means for opening and closing the valve.

Fluid couplers are used to establish a flow connection between two tubes or vessels which are filled, for example, with ink. The devices to be connected, such as hose ends, must be coupled together reliably, and the manipulations involved in the coupling process must be performable by relatively unskilled personnel. Further, the fluid medium must not be permitted to escape nor must air from the atmosphere enter into the connection point or into the interiors of the tubes or vessels. In addition, it is desirable that such device be usable for hydraulic as well as pneumatic systems.

German Pat. No. 2,416,836 discloses a device which achieves coupling and securing by the use of connecting tubes, each connecting tube being kept closed by a deformable closing, or blocking, member. When the connecting tubes are brought together, the closing member of each tube is displaced by rigid abutments disposed at the other tube. This produces a flow passage in each connecting tube through which the fluid can flow, the flow passage being produced during the connection of the tubes and no means being provided for closing the flow passage while the connecting tubes are coupled together.

U.S. Pat. No. 4,330,010 to Drescher et al. discloses a device which includes two coupling tubes in communication with the interiors of respective enclosures, each provided with a controllable closing member. The tubes are arrestable against one another in a position to establish a leakage-free connection between their flow passages. The formation and closing of the flow gap is effected by an adjusting means actuated by movement of a handle. However, this manipulation requires a certain skill on the part of the operator and the coupler is rather expensive to manufacture.

It is an object of the present invention to provide a coupling for the leakage-free connection of pipes and containers filled with a gas or other fluid which is simple in design, easy to handle, reliably prevents the medium from escaping and which prevents the entry of air into the filled pipes and containers.

SUMMARY OF THE INVENTION

In accordance with the present invention, a fluid coupler is provided for making a leakage—free connection between first and second fluid-containing members. One half of the coupler comprises a plate having a conical opening in one surface across which an elastic sealing membrane is stretched by a clamping ring. The elastic sealing membrane has a slit at its center which is kept closed by the stretching action of the clamping ring. The other half of the fluid coupler comprises a hemispherical member having an axial aperture and a valve which is positioned within the aperture. When the two coupling halves are brought together, the hemispherical member presses against the elastic sealing membrane thereby opening the slit and expelling any air present in the coupling region.

The coupling according to the invention comprises simple components which permit easy coupling by way of a few manipulations. Opening of the flow gap in the one valve occurs automatically during coupling while the flow gap of the other valve is opened automatically by an increase in pressure in the inlet channel. The operator need not perform any additional manipulations to open the flow gaps.

BRIEF DESCRIPTION OF THE DRAWINGS

FIG. 1 is a diagrammatic view of an ink printer equipped with a fluid coupler in accordance with the present invention.

FIG. 3 shows another embodiment of a fluid coupler according to the invention.

FIGS. 4a through 4d show the operation of an elastic sealing membrane forming part of the fluid couplers of FIGS. 2 and 3.

DESCRIPTION OF THE PREFERRED EMBODIMENT

Figure 2:
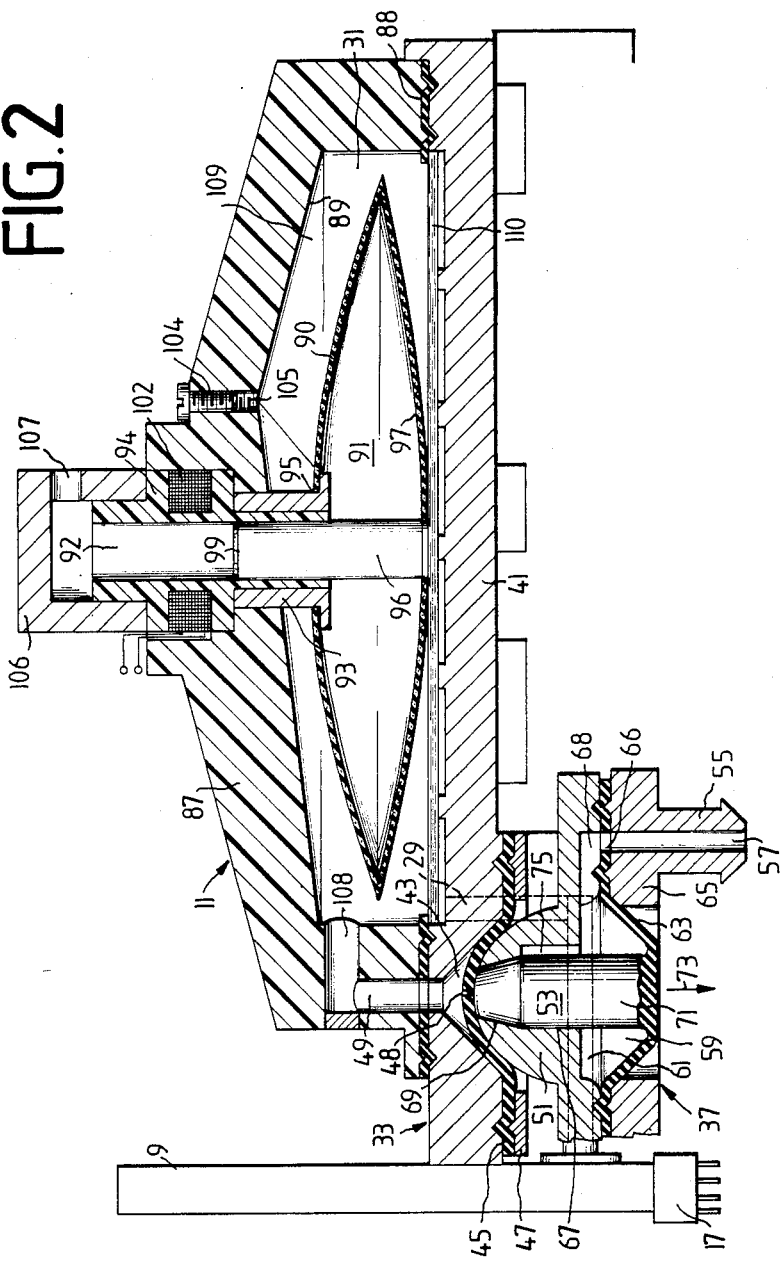
FIG. 2 is an enlarged cross-sectional view of an intermediate ink container shown in FIG. 1.

Referring to FIG. 1, an ink printer is shown which comprises a carriage 7 that travels on rails 1 and 3 along a record carrier 5. An ink mosaic printing head 9 and an intermediate ink container 11 are removably disposed on the carriage 7, the record carrier 5 being movable over a platen 13 driven by a stepping motor (not shown). During intervals between printing, the ink printing head 9 is moved into a housing and cleaning station 15 disposed outside the printing region for the insertion of a new record carrier 5 and for the purpose of cleaning the nozzle surfaces of the printing head as described in U.S. Pat. No. 4,144,537.

The ink printing head 9 and the intermediate ink container 11 form a replaceable unit, with the ink printing head 9 being provided with one coupling half 17 and the carriage 7 with a mating coupling half 19 of an electrically actuated coupler 21. The coupling half 19 of the coupler 21 attached to the carriage 7 is connected, by means of a printed wire connection 23 and a further electrical coupling device 25, to a control element 27. Control element 27 transmits control pulses via the printed wire connection 23 to piezoelectric elements disposed in the printing head 9 to cause individual ink droplets to be ejected in a known asynchronous manner from the discharge nozzles of pressure chambers within the head. The printing head 9 and its control element 27 are known devices as described in U.S. Pat. No. 3,871,004, issued Mar. 11, 1975 and in U.S. Pat. No. 3,747,120, issued July 17, 1973.

Ink mosaic printing heads require that their chambers be replenished with ink to replace the ink ejected in the form of the droplets which provide the mosaic printed characters on the record carrier 5. For this purpose, the ink printing head 9 is connected by a channel 29 (FIG. 2) to an ink chamber 31 in the intermediate ink container 11.

A hydraulic coupling 35 having a coupling half 37 secured to the carriage 7 and a coupling half 33 attached to the intermediate ink container 11 is provided. When the hydraulic coupling 35 is actuated, ink is supplied to the container 11 from an ink supply hose 39. Coupling half 33 is integral with a bottom plate 41 of the intermediate ink container 11, bottom plate 41 having a conical recessed opening 43 and an elastic sealing membrane 45 that closes the wide portion of the opening with an airtight seal.

The sealing membrane 45 is connected to the bottom plate 41 by means of a clamping ring 47 in such a manner that, in the decoupled state of the intermediate container 11, the membrane 45 is under tension and disposed just in front of the opening 43. The elastic sealing membrane 45 has a slit 48 which automatically closes and opens during the coupling process, the widened opening 43 of the membrane being in flow-connection via channel 49 with chamber 31.

Coupling half 37, which is rigidly attached to the carriage 7, has a hemispherical member 51 with which the sealing membrane 45 is pressed during the coupling process against the conical surface defining opening 43. The slit 48 in the sealing membrane 45, which is pressed against the face of hemispherical member 51, is expanded in front of an opening in the valve 53 of hemispherical member 51, and any air present in the coupling area is urged outwardly through the opened slit. This prevents the entrance of air into the gas or liquid filled channel 49.

The connecting pipe end 55 which is coupled to the ink hose 39 is provided with a channel 57 in flow-connection, via a bore 66 and a channel 68, with a chamber 59 in the coupling half 37. Chamber 59 includes a recess 61 disposed below the hemispherical member 51 and a membrane 63 sealing the recess. Membrane 63 is fixed to the hemispherical member 51 by a clamping ring 65 forming part of coupling half 37.

Recess 61 includes an outlet channel 67 which has a conical bore 69 that is tapered toward the opening in the hemispherical member 51 and in which a conical pin 71 guided in the outlet channel 67 is positioned. The conical pin 71 and the membrane 63 are made of one piece, with the membrane 63 being tensioned in such a manner that the pin 71 can be securely pressed into the conical bore 69, pin 71 forming part of valve 53.

If the pressure in chamber 59 is increased by the pumping pressure in channel 57, the membrane 63 and the conical pin 71 are moved downwardly in the direction of arrow 73. This opens valve 53 and permits ink to be forced through a flow gap in conical bore 69, the widened slit 48 in membrane 45 and through channel 49 into chamber 31 of the intermediate ink container 11. If the pumping pressure in chamber 59 of the coupling half 37 decreases, valve 53 closes automatically, the tension in membrane 63 being less than the force exerted by the operating pressure. The flow of ink from chamber 59 is enhanced by a compensating bore 75 in outlet channel 67.

Valve 53 in coupling 37 opens and closes automatically with changes in the pressure in chamber 59. The membrane 45 which acts as a valve in coupling half 33 is closed automatically when the intermediate ink container 11 is removed and is opened again when the container is replaced. The leakage free connection of the two coupling halves 33 and 37 of the hydraulic coupling 35 is thus effected without additional adjusting means for opening and closing the channels.

The ink supply hose 39 is connected with a pump 79 driven by a motor 77. Pump 79 is in flow connection, via a line 81 and a hydraulic coupling 83, having two coupling halves 82 and 84, with a stationary ink reservoir 85.

Coupling halves 82 and 84 of the hydraulic coupling 83 are shown in the decoupled state in FIG. 3 wherein parts similar to those of FIG. 2 are identified by the same numbers with the addition of primes. In FIG. 3, since the two coupling halves 82 and 84 are separated, the elastic sealing membrane 45' of the coupling half 82 is stretched tightly across the opening 43' in plate 41' with the slit 48' closed. Membrane 45' is held in place by a clamping ring 47'. The coupling half 84 is similar to coupling half 37 except that the conical pin 71' and membrane 63' consist of two parts connected together rather than being an integral unit as in coupling 35. The membrane 63' is clamped between a hemispherical member 51' and a clamping ring 65'. The resiliency of membrane 63' may be reinforced by the use of a separate spring (not shown).

FIGS. 4a through 4d show the portion of the sealing membrane 45 (or 45') including the slit 48 (or 48'). (In the following description, the primed reference numerals will be omitted but it will be understood that the discussion relates to the embodiments of both FIGS. 2 and 3).

FIG. 4c shows the sealing membrane 45 when the coupling halves are separated and the slit 48 closed, as illustrated in FIG. 3. FIG. 4a depicts the opened slit 48 when the coupling halves are joined together and the hemispherical member 51 urges the membrane 45 against the surface of the opening 43, as shown in FIG. 2. In a typical application, the length of the self-sealing slit 48 in the membrane 45 is about 1 mm and the membrane is made of silicone or butyl rubber manufactured by Freudenberg, Weinheim, Germany.

In the pressure-free state, or if pressure surges occur due to transport, the self-sealing characteristic of the sealing membrane 45 prevents the slit 48 from opening thereby preventing leakage losses. FIG. 4b shows the sealing membrane 45 at a subatmospheric pressure as indicated by arrow 100 and FIG. 4d at excess pressure as indicated by arrow 102 in the conical widened opening 43. In view of this construction, leakage losses are avoided during transport. The coupling is suitable for gas filled containers and pipes as well as for fluid filled containers and pipes.

The ink chamber 31 in the intermediate ink container 11 is formed by a cylindrical recess in a cover 87 which is fixed to the bottom plate 41, a sealing membrane 88 being disposed between the cover 87 and the bottom plate 41. A discus-shaped bladder 90 made of butyl rubber is suspended from the upper portion 89 of the ink chamber 31, the interior 91 of this bladder being connected, via an air opening 92, with the atmosphere in such a manner that the volume of air in the bladder 90 automatically adapts itself to the volume of ink in the ink chamber.

A collar 93 projects from an opening 95 in bladder 90 and is fixed to an insert 94 concentrically mounted in cover 87, the air opening 92 disposed in the insert 94 opening into the interior of bladder 91. A sensor pin 96 is movably mounted within the cylindrical air opening 92 and rests on the movable bottom 97 of the bladder 90 due to its own weight. The sensor pin 96 is provided with a flattened portion (not shown) through which air can flow into and out of the interior of the bladder 91.

The upper end 99 of the sensor pin 96 cooperates with an interrogating element including an induction coil 102 arranged concentrically around air opening 92 in insert 94 which controls the motor 77 for pump 79. Motor 77 for pump 79 is controlled in accordance with the amount of ink in the ink chamber of the intermediate ink container 11 in such a manner that sufficient ink is always available to flow into the ink printing head 9. The control for motor 77 is disclosed in greater detail in copending application Ser. No. 417,894, filed Sept. 14, 1982 by Sicking et al. and assigned to the same assignee as the present invention.

A ventilating hole 105 that can be closed by a screw 104 is eccentrically disposed in the cover 87 of intermediate container 11. The ventilating hole 105 is disposed at the highest point of ink chamber 31 with the upper portion 89 of the cover being sloped away from the hole. To prevent the sensor pin 96 from falling out of the air hole 92 and dirt entering the interior of the bladder 91, the insert 94 is provided with a cap 106 having a ventilation hole 107 in its side.

Ink is supplied, with valve 53 open, through channel 49 which abuts perpendicularly on a bore 108 in cover 87. Bore 108 opens tangentially into the region of the cover 87 of the ink chamber 31 so that air bubbles are prevented from developing along the walls of the ink chamber and instead move directly into a bubble collecting chamber 109 which has the ventilation hole 105. The entrance of gas bubbles into the ink printing head 9 is also prevented by a filter 110 disposed in front of the outlet channel 29 in the bottom plate 41 of the intermediate container 11.

The bladder 90 serves as a volume compensator with the reduced ink volume in ink chamber 31 during printing being compensated by an increase in the size of bladder 90. The inherent tension in bladder 90 is in part compensated by the weight of sensor pin 96 but is still high enough to provide the desired compensation. The discus type design of bladder 90 prevents sudden pressure fluctuations in ink chamber 31, which may develop in the ink chamber during replenishing or transporting of ink, from being transferred to the ink printing head 9 resulting in a malfunction of the head. The intermediate ink container 11 is disclosed in greater detail in the aforesaid copending application Ser. No.

It will be understood that the above description of the present invention is susceptible to various modifications, changes and adaptations, and the same are intended to be comprehended within the meaning and range of equivalents of the appended claims.

What is claimed is:

1. A fluid coupler for making a leakage-free connection between first and second fluid-containing members, the assembled coupler having a longitudinal axis, comprising:
    a first half-coupler, including
        a plate having first and second surfaces normal to said longitudinal axis, said first surface having an axial conical opening therein with the wider portion of said conical opening in the plane of said first surface, the narrower portion of said conical opening being connected to the second surface of said plate by an axial fluid passage for connection to said first fluid-containing member;
        an elastic sealing membrane having a slit therein, said slit being located along said longitudinal axis; and
        a clamping ring clamping said elastic sealing membrane across the conical opening in the first surface of said plate, said clamping ring maintaining said elastic sealing membrane substantially parallel to the first surface of said plate with said slit in the closed position; and
    a second half-coupler for mating with said first half-coupler, including
        a hemispherical member having a hemispherical surface with an axial aperture therein;
        valve means positioned within the axial aperture of said hemispherical member, said hemispherical surface being pressed against said elastic sealing membrane when said first and second half-couplers are engaged thereby opening the slit in said elastic sealing membrane and expelling any air present in the coupling region;
        an input channel means for connecting said second half-coupler to said second fluid-containing member; and
        resilient means coupling said input channel means to said valve means, said valve means being opened to permit fluid flow through said axial aperture in said hemispherical member when the pressure in said input channel is increased and being closed by said resilient means when said pressure is decreased, said resilient means including an additional membrane interposed under tension between said input channel means and said hemispherical member, the space between said additional membrane and said hemispherical member forming a chamber connected to said second fluid containing member, the position if said valve means being determined by the fluid pressure in said chamber acting on said additional membrane and by the resilient force exerted by said additional membrane,
    wherein said valve means includes a conical pin affixed to said additional membrane, and the axial aperture in said hemispherical member has a conical bore tapered toward the opening in said hemispherical surface, said conical pin being pressed toward said opening by said additional membrane.

2. A fluid coupler as defined in claim 1 wherein the portion of the aperture in said hemispherical member between its conical bore and said chamber is semi-cylindrical in shape.

3. A fluid coupler as defined in claim 1 wherein said additional membrane and conical pin are formed as a single integral element.

4. A fluid coupler as defined in claim 3 wherein said input channel means comprises a clamping ring for clamping the periphery of said additional membrane to the periphery of said hemispherical member, said input channel means further comprising a connecting pipe for flow-connecting said second fluid-containing member to said chamber via a bore in said additional membrane and an inlet channel located between said input channel means and said hemispherical member.

5. In combination with a printing apparatus comprising a carriage which is movable along and adjacent to a record carrier; an ink printing head for applying ink to said record carrier, said ink printing head being attachable to said carriage; and an intermediate container flow-connected to said ink printing head for supplying ink thereto, said intermediate container having a bottom plate including a surface normal to a longitudinal axis and having an axial conical opening therein, the wider portion of said conical opening being in the plane of said surface, a fluid coupler comprising:
    a first half-coupler including
        a first elastic sealng membrane having a slit therein, said slit being located along said longitudinal axis;

a clamping ring clamping said elastic sealing membrane across the conical opening in the surface of said bottom plate, said clamping ring maintaining said elastic sealing membrane substantially parallel to the surface of said bottom plate with said slit in the closed position; and a second half-coupler for mating with said first half-coupler attached to said carriage, said second half-coupler including a hemispherical member having a hemispherical surface and having an axial passage therethrough, said passage having a first and a second end with a conical bore tapering toward said hemispherical surface;

a second elastic membrane clamped to said hemispherical member and covering the first end of said passage;

means for introducing ink between said second membrane and said hemispherical member; and valve means positioned within the passage of said hemispherical member, said valve means including a conical pin affixed to said second membrane and pressed toward the second end of the passage by said second membrane, said hemispherical surface being pressed against said first elastic sealing membrane when said first and second half-couplers are engaged thereby opening the slit in said first elastic sealing membrane and expelling any air present in the coupling region.

6. A fluid coupler for making a leakage-free connection between first and second fluid-containing members, the assembled coupler having a longitudinal axis, comprising:

a first half-coupler including a plate having first and second surfaces normal to said longitudinal axis, said first surface having an axial conical opening therein with the wider portion of said conical opening being in the plane of said first surface, the narrower portion of said conical opening being connected by an axial fluid passage to the second surface of said plate and to said first fluid-containing member;

a first elastic sealing membrane having a slit therein, said slit being located along said longitudinal axis; and a first clamping ring clamping said first elastic sealing membrane across the conical opening in the first surface of said plate, said clamping ring maintaining said first elastic sealing membrane substantially parallel to the first surface of said plate with said slit in the closed position; and a second half-coupler for mating with said first half-coupler, including a hemispherical member having a hemispherical first surface and an opposite second surface, said hemispherical member having an axial passage between said first and second surfaces, said passage including a conical bore tapering toward said first surface;

a second elastic sealing membrane having a central portion;

a second clamping ring clamping said second elastic sealing membrane to the periphery of the second surface of said hemispherical member to form a centrally located chamber therebetween, said second clamping ring including a channel portion for connecting said chamber to said second fluid-containing member; and valve means including a conical pin secured to the central portion of said second elastic sealing membrane and projecting into the passage of said hemispherical member, said conical pin being pressed toward said hemispherical surface by said second elastic sealing membrane, said hemispherical surface pressing against said first elastic sealing membrane when said first and second half-couplers are engaged thereby opening the slit in said first elastic sealing membrane and expelling any air present in the coupling region.

* * * * *